(12) United States Patent
Tortellier

(10) Patent No.: US 9,452,649 B2
(45) Date of Patent: Sep. 27, 2016

(54) TILTING TRAILER COMPRISING A SLIDING ARTICULATED DRAWBAR

(71) Applicant: CICT, Servon-sur-Vilaine (FR)

(72) Inventor: Christian Tortellier, Servon-sur-Vilaine (FR)

(73) Assignee: CICT, Servon-sur-Vilaine (FR)

( * ) Notice: Subject to any disclaimer, the term of this patent is extended or adjusted under 35 U.S.C. 154(b) by 0 days.

(21) Appl. No.: 14/407,414

(22) PCT Filed: Jun. 11, 2013

(86) PCT No.: PCT/EP2013/061953
§ 371 (c)(1),
(2) Date: Dec. 11, 2014

(87) PCT Pub. No.: WO2013/186186
PCT Pub. Date: Dec. 19, 2013

(65) Prior Publication Data
US 2015/0123378 A1    May 7, 2015

(30) Foreign Application Priority Data
Jun. 11, 2012 (FR) .................................... 12 55448

(51) Int. Cl.
*B62D 63/06* (2006.01)
*B60D 1/46* (2006.01)
(Continued)

(52) U.S. Cl.
CPC ............. *B60D 1/465* (2013.01); *B60D 1/1675* (2013.01); *B60D 1/246* (2013.01); *B60D 1/486* (2013.01); *B60P 1/02* (2013.01); *B60P 1/027* (2013.01); *B60P 1/08* (2013.01); *B60P 1/18* (2013.01)

(58) Field of Classification Search
CPC .... B60D 1/465; B60D 1/1675; B60D 1/246; B60D 1/486; B60P 1/02; B60P 1/027; B60P 1/08; B60P 1/18
USPC ...................... 280/490.1, 491.1, 6.151, 43.18
See application file for complete search history.

(56) References Cited

U.S. PATENT DOCUMENTS

| | | | | |
|---|---|---|---|---|
| 3,601,424 A | * | 8/1971 | Badland | B60G 11/225 267/258 |
| 4,394,105 A | * | 7/1983 | Mitchell | B62D 63/062 298/17 SG |
| 4,529,220 A | * | 7/1985 | Wright | B62D 63/061 280/149.2 |

(Continued)

FOREIGN PATENT DOCUMENTS

| | | |
|---|---|---|
| DE | 2651936 A1 | 5/1978 |
| DE | 202122 A5 | 8/1983 |

(Continued)

OTHER PUBLICATIONS

International Search Report dated Aug. 21, 2013 for corresponding International Application No. PCT/EP2013/061953, filed Jun. 11, 2013.

(Continued)

*Primary Examiner* — Tony Winner
(74) *Attorney, Agent, or Firm* — David D. Bush; Westman, Champlin & Koehler, P.A.

(57) ABSTRACT

A tilting trailer is proposed that includes a chassis mounted on an axle that pivots with respect to wheels of the trailer. The trailer includes an articulated drawbar mounted on the axle, the articulated drawbar being mounted so that it is free and sliding with respect to the chassis; and an actuator sliding the articulated drawbar. The articulated drawbar is V-shaped, a first end is fixed to a hitch tongue, a second end is fixed to the axle near a first wheel, and a third end is fixed to the axle near a second wheel.

14 Claims, 7 Drawing Sheets

Figure 1A:
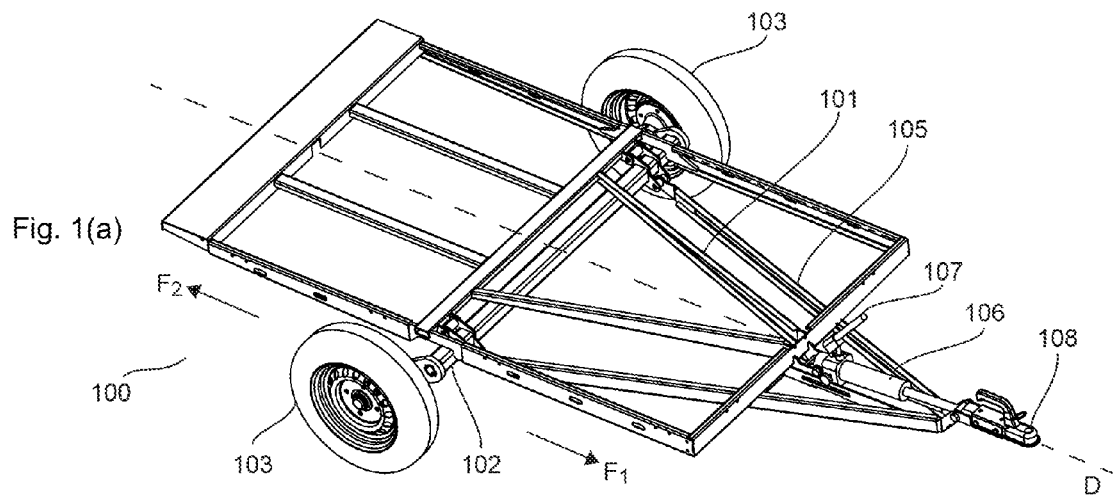

(51) Int. Cl.
  *B60P 1/02*   (2006.01)
  *B60P 1/08*   (2006.01)
  *B60P 1/18*   (2006.01)
  *B60D 1/167*  (2006.01)
  *B60D 1/24*   (2006.01)
  *B60D 1/48*   (2006.01)

(56) References Cited

U.S. PATENT DOCUMENTS

| | | | |
|---|---|---|---|
| 5,975,828 A | 11/1999 | Weldy | |
| 8,172,248 B2 * | 5/2012 | Groves | B60P 1/027 280/414.5 |
| 8,651,510 B2 * | 2/2014 | Fankhauser | B60G 3/14 280/490.1 |
| 8,727,360 B2 * | 5/2014 | Catford | B60G 5/00 280/43.18 |
| 2005/0067799 A1 * | 3/2005 | Smith | B60P 1/027 280/6.151 |
| 2006/0045693 A1 | 3/2006 | Elliot et al. | |
| 2009/0205164 A1 * | 8/2009 | Larson | B60B 33/045 16/44 |
| 2010/0259026 A1 * | 10/2010 | Patmont | B62K 25/16 280/124.169 |
| 2012/0020762 A1 * | 1/2012 | Roose | B60P 1/025 414/495 |

FOREIGN PATENT DOCUMENTS

| | | |
|---|---|---|
| DE | 202005000051 U1 | 5/2006 |
| IE | 20060467 A1 | 2/2007 |

OTHER PUBLICATIONS

International Preliminary Report on Patentability and English translation of the Written Opinion dated Dec. 16, 2014 for corresponding International Application No. PCT/EP2013/061953, filed Jun. 11, 2103.

* cited by examiner

TOP POSITION

BOTTOM POSITION

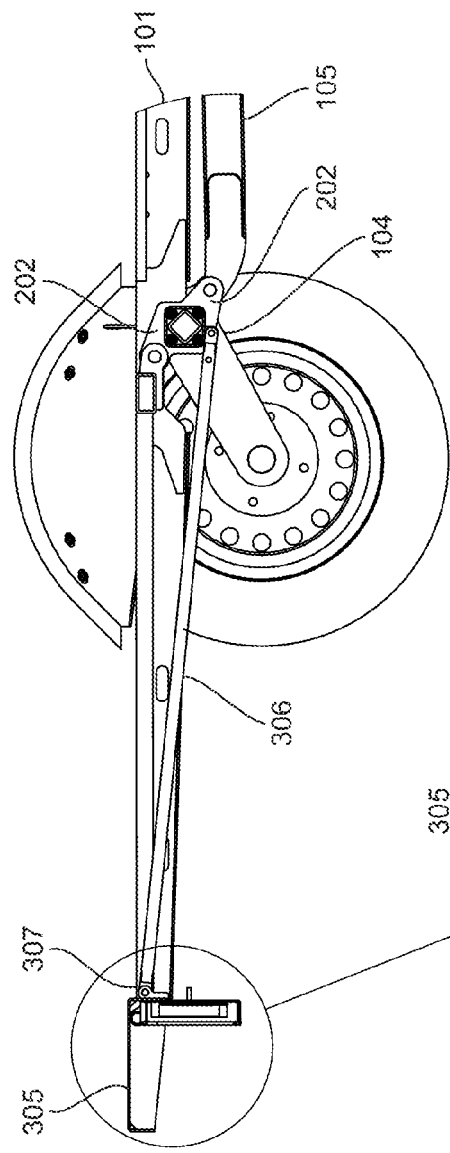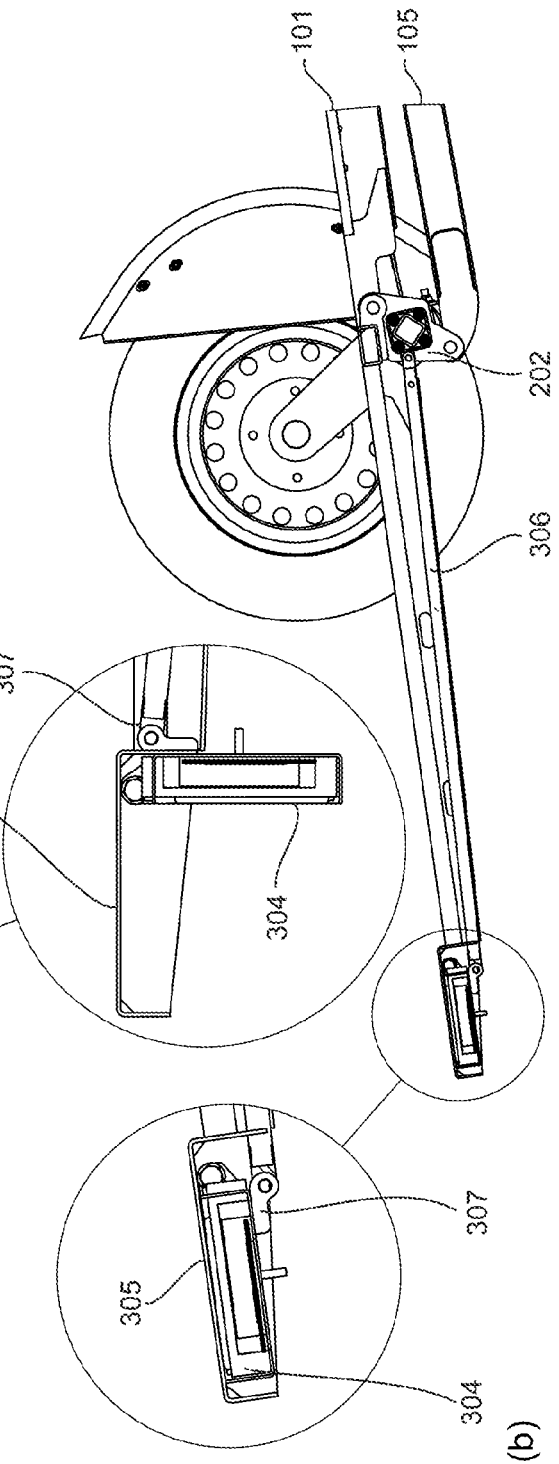

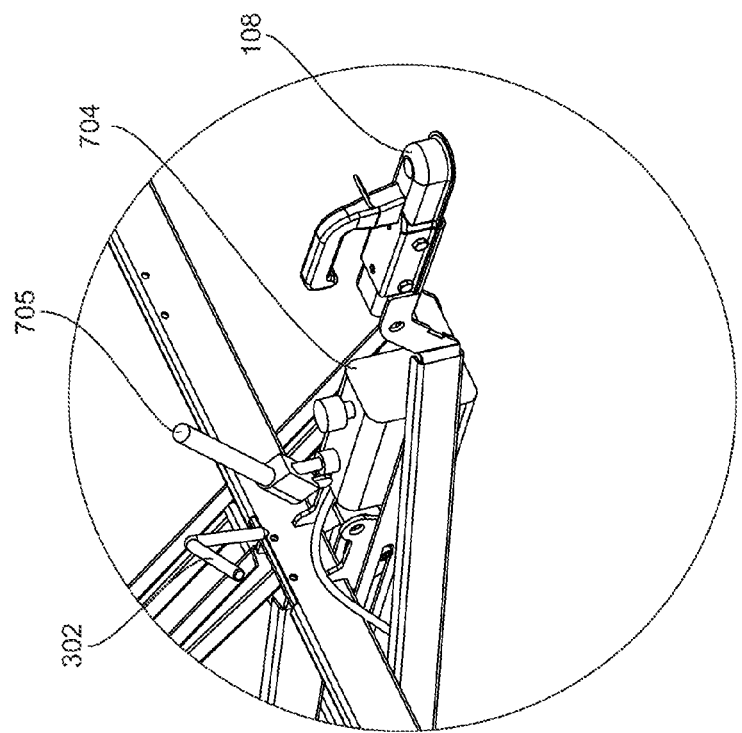
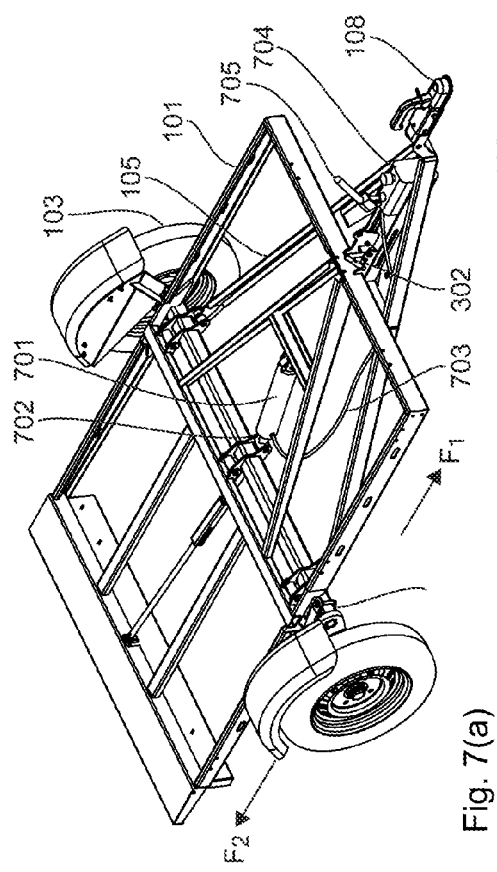
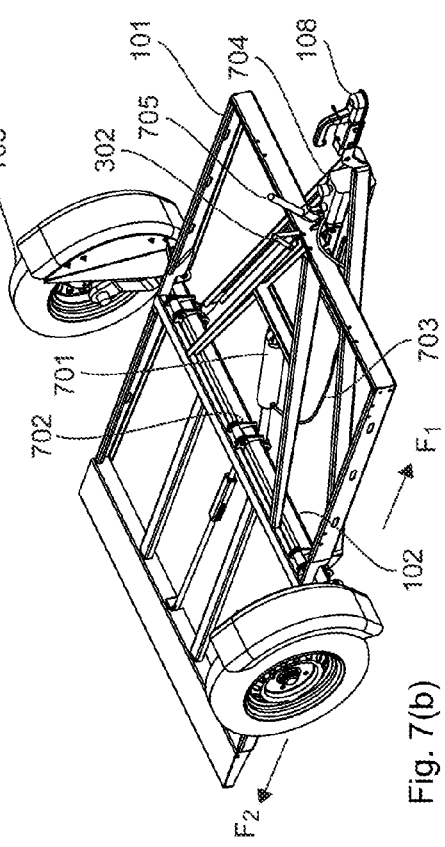
Fig. 7(a)
Fig. 7(b)
Fig. 7(c)

TILTING TRAILER COMPRISING A SLIDING ARTICULATED DRAWBAR

CROSS-REFERENCE TO RELATED APPLICATION

This application is a Section 371 National Stage Application of International Application No. PCT/EP2013/061953, filed Jun. 11, 2013 and published as WO 2013/186186 A1 on Dec. 19, 2013, not in English, the contents of which are hereby incorporated by reference in their entirety.

FIELD OF THE INVENTION

The field of the invention is that of tilting trailers.

More precisely, the invention relates to a tilting trailer that allows a user to load and to unload alone heavy and bulky objects such as motorcycles, household electrical equipment, garden equipment (for example a ride-on mower, a mini-tractor), etc.

TECHNOLOGICAL BACKGROUND

In prior art, different types of tilting trailers are known allowing a person who is alone to load and unload heavy and bulky objects, via the use of a trolley.

For example, in document U.S. Pat. No. 5,975,828 such a trailer is proposed comprising a drawbar mounted integral with the chassis of the trailer, as well as a system for tilting the chassis. Such a system of tilting comprises a single cable attached to the centre of an axle, controlling the tilting or the lifting of the chassis according to the tension exerted on the cable.

A disadvantage of the known solution is that such a system of tilting can be deteriorated or worn by outside elements (gravel, impacts), of through the positioning and the nature of the cable that is mounted under the chassis of the trailer.

Another disadvantage of the known solution is that as the cable is mounted at the centre of the axle, the latter tends to be deformed when the cable is stretched and a heavy load is positioned on the trailer.

Yet another disadvantage of the known solution is that the management of the tension of the cable must be carried out by an electronic device, which can be improved more than a mechanical device, and which requires electrical power.

Yet another disadvantage of the known solution is that the tension of the cable has to be verified often in order to prevent an untimely tilting of the chassis in particular during driving.

Yet another disadvantage of the known solution is that means of braking must be used in order to slow down the speed at which the lowering of the chassis takes place.

Other techniques presented in the documents US2006/0045693, US2012/0020762, US 2005/0067799, IE 2006/0467 have been developed, however these techniques also have disadvantages similar to those exposed hereinabove. In addition, these techniques are relatively complex to implement and require many modifications to be made to a conventional trailer.

SUMMARY

In a particular embodiment of the invention, a tilting trailer is proposed comprising a chassis mounted on an axle that pivots with respect to wheels of said trailer, and:

an articulated drawbar mounted on said axle, said articulated drawbar being mounted so that it is free and sliding with respect to said chassis, and actuating means of the sliding of said articulated drawbar.

Such a trailer is remarkable in that said one articulated drawbar is V-shaped, a first end being fixed to a hitch tongue, a second end being fixed to said axle in the vicinity of a first wheel, and a third end being fixed to said axle in the vicinity of a second wheel.

As such, this particular embodiment of the invention is based on an entirely new and inventive approach consisting in using an articulated drawbar that contributes to the pivoting of an axle with respect to the wheels, when the latter slides with respect to the chassis, said sliding being activated by said actuating means.

Furthermore, an articulated drawbar having such a shape has increased resistance to deformation with respect to other shapes, with regards to the weight of the loads present on the trailer.

As such, the technical features of this trailer make it possible to achieve all of the aforementioned objectives.

Note that, according to this invention, the articulated drawbar is not mounted fixed on the chassis. Indeed, it is mounted free (or independent) with respect to the latter, contrary to the solutions proposed in prior art.

According to a particular feature, such a trailer is remarkable in that it comprises a number plate fixed to said chassis, and means for retracting said number plate that make it possible to retract said plate during the tilting of said chassis.

As such, the use of means for retracting makes it possible to prevent the number plate from forming an obstacle to the lowering of the chassis, and therefore to the loading/unloading of objects. Indeed, without these means for retracting, a clearance can subsist between the chassis and the ground, which obliges the user to lift the objects to be loaded/unloaded.

According to a particular feature, such a trailer is remarkable in that said means for retracting are activated automatically during the activation of the actuating means.

According to a particular feature, such a trailer is remarkable in that said means for locking include a pin or a rivet.

According to a particular feature, such a trailer is remarkable in that said means for guiding include rails, or rolling elements.

According to a particular feature, such a trailer is remarkable in that said actuating means include a control lever and a cylinder belonging to the listing including:
 a hydraulic cylinder;
 a pneumatic cylinder;
 an electric cylinder;
 a mechanical cylinder.

As such, the use of a cylinder makes it possible to control the speed of the descent of the chassis, in that the lowering of the chassis is not carried out rapidly. As such, the objects already loaded are not altered (indeed, a rapid lowering is necessarily brutal, potentially inducing impacts that can alter objects already loaded on the trailer, which this invention makes it possible to avoid).

According to a particular feature, such a trailer is remarkable in that said actuating means are mounted in the vicinity of a hitch tongue mounted on said articulated drawbar.

As such, a user can easily access the actuating means, without having to position himself under the trailer.

According to a particular feature, said actuating means are integral with said chassis and with said articulated drawbar.

According to a particular feature, such a trailer comprises means for guiding said articulated drawbar making it possible to guide a movement of said articulated drawbar during a sliding of said articulated drawbar with respect to said chassis.

According to a particular feature, such a trailer comprises means for locking a position of said articulated drawbar.

According to a particular feature, such a trailer is remarkable in that said control lever and said cylinder are integral.

According to a particular feature, such a trailer is remarkable in that a first portion of said actuating means is mounted on said articulated drawbar, and that a second portion of said actuating means is mounted on said axle.

According to a particular feature, such a trailer is remarkable in that said first portion of said actuating means comprises a pump, and in that said second portion of said actuating means comprises a cylinder connected to said pump.

According to a particular feature, such a trailer comprises means of suspension located inside said axle.

LIST OF FIGURES

Figure 1B:
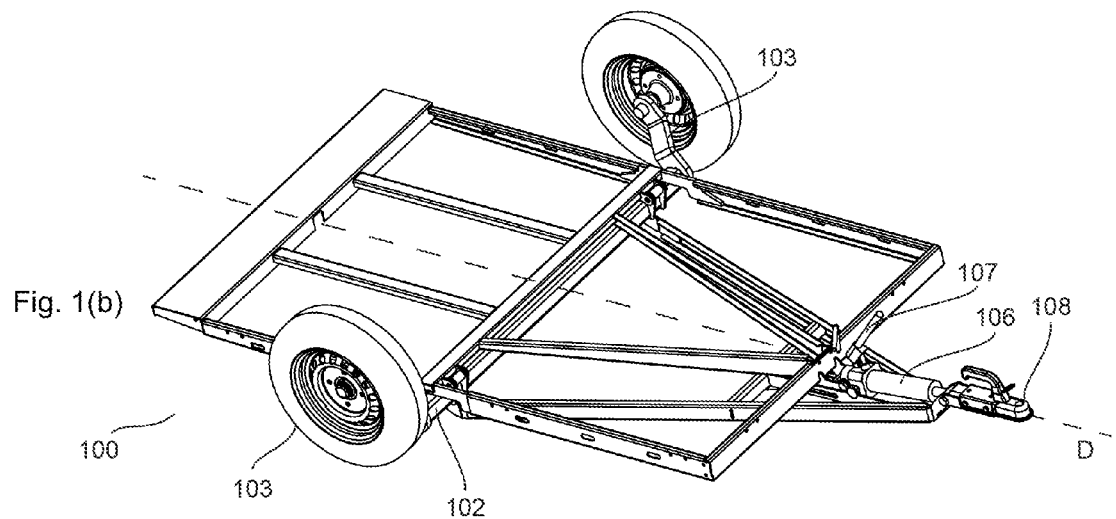
Figure 2A:
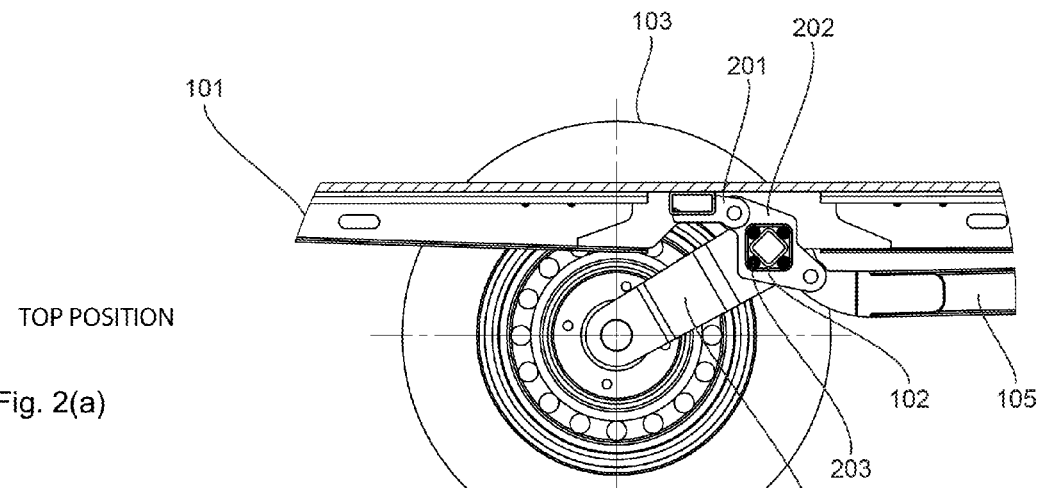
Figure 2B:
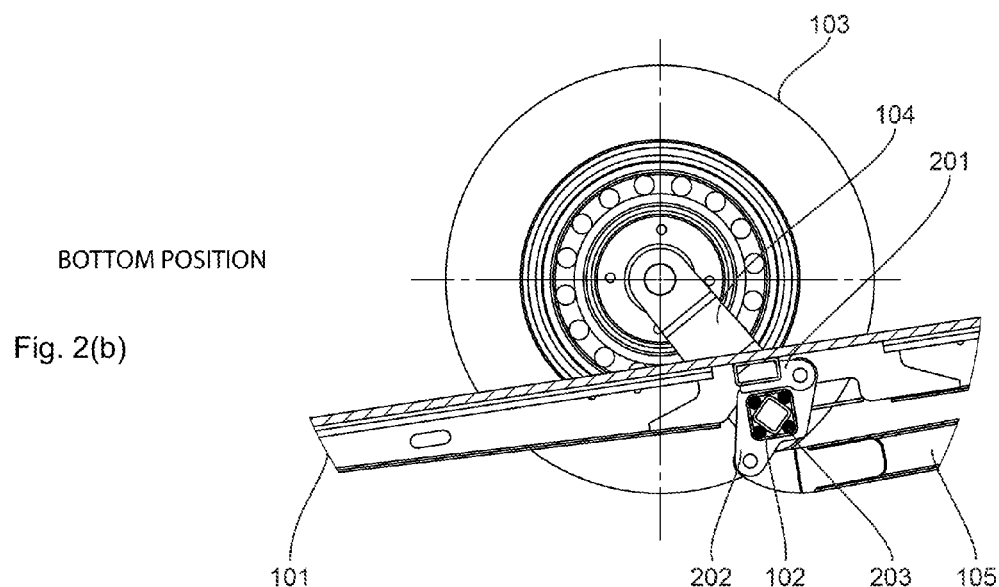
Figures 3A, 3B:
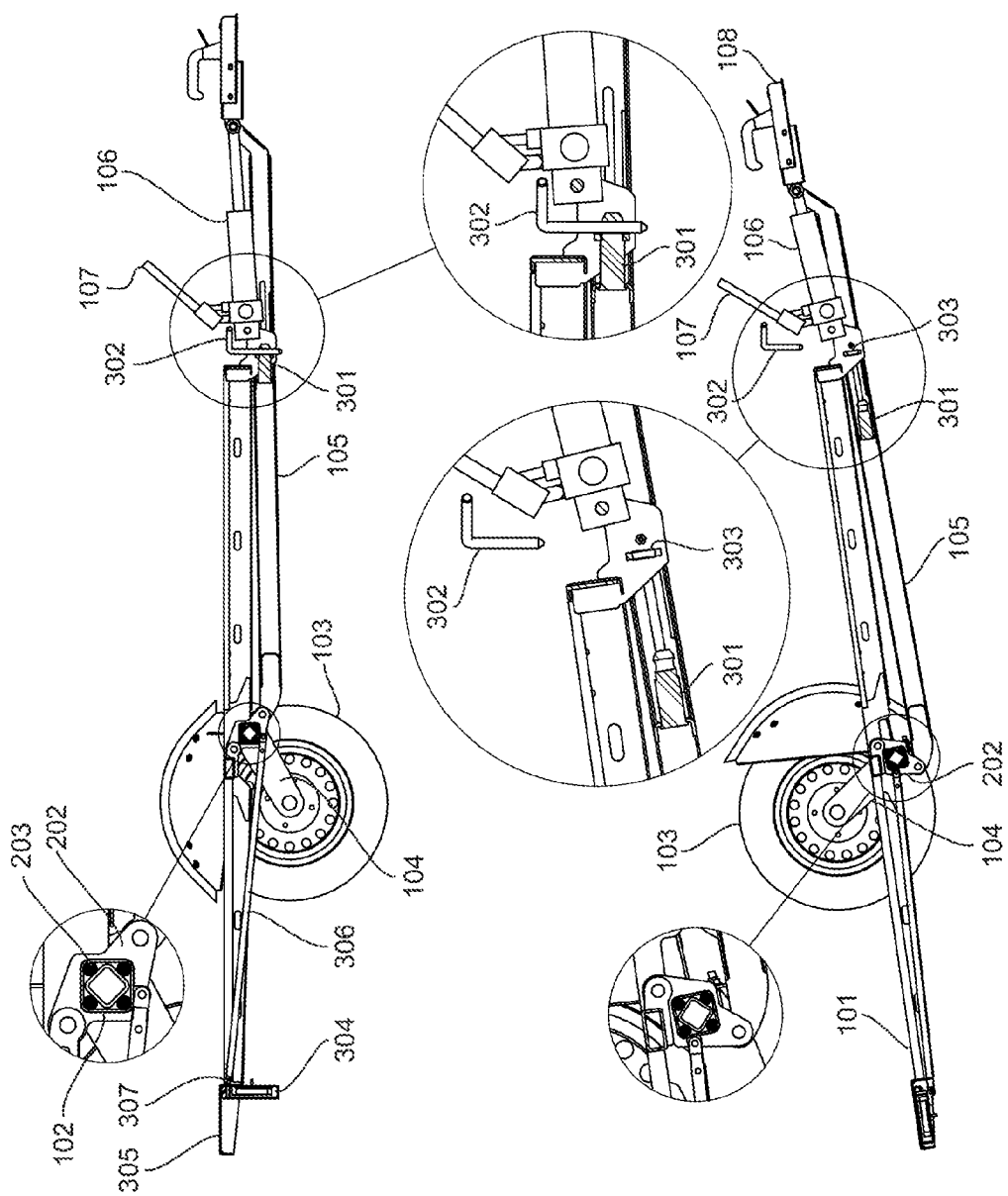
Figure 5A:
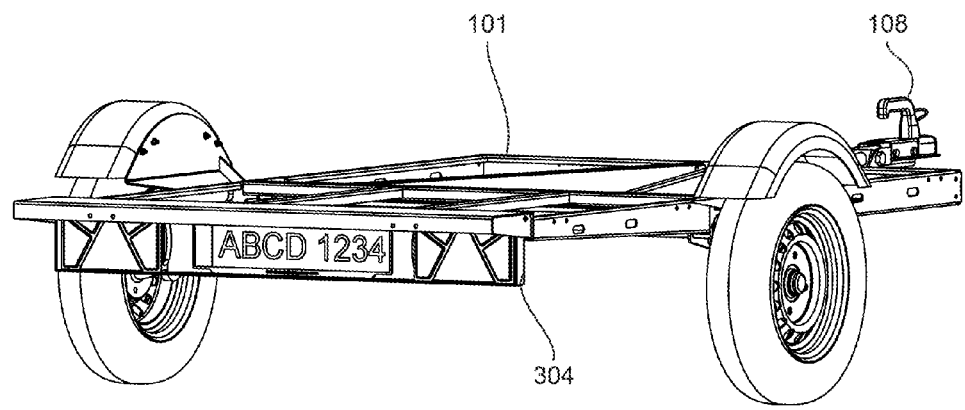
Figure 5B:
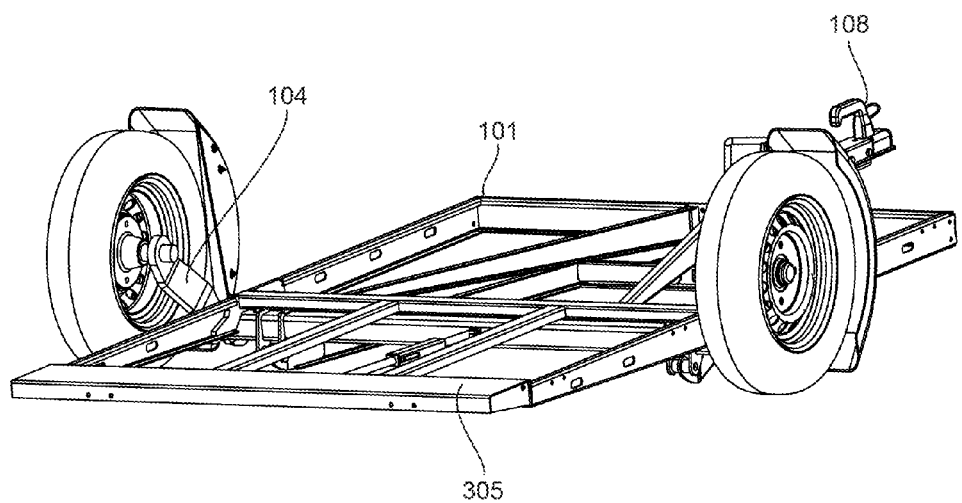
Figure 6A:
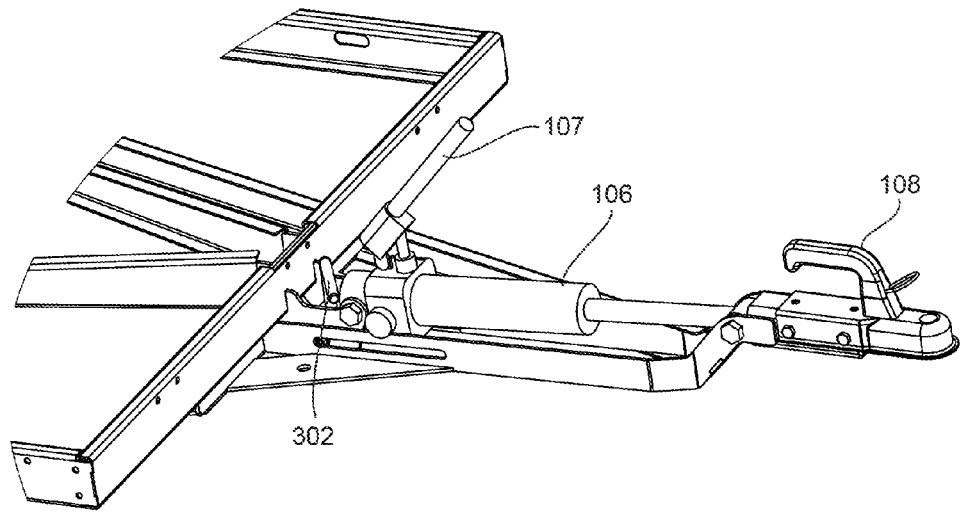
Figure 6B:
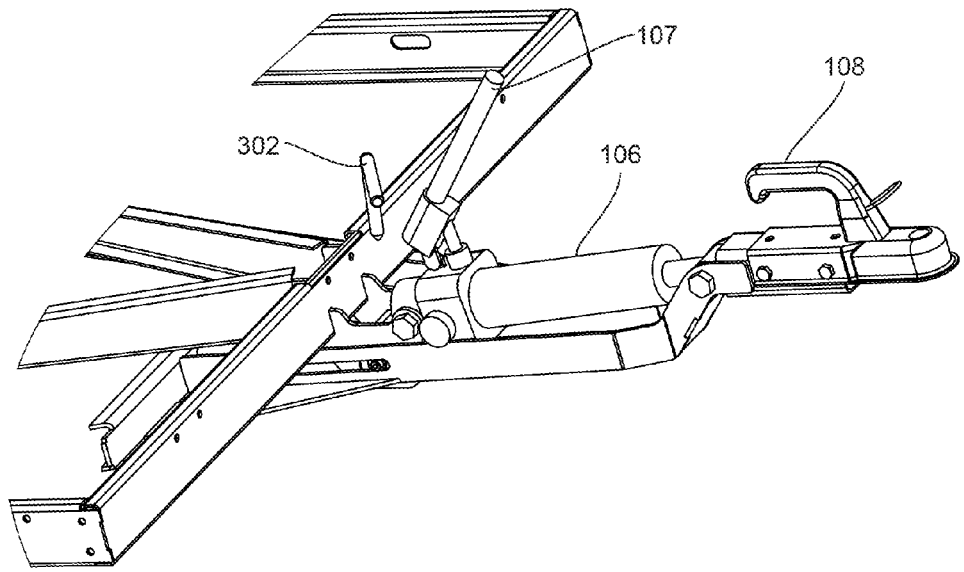

Other features and advantages of the invention shall appear when reading the following description, given for the purposes of information and in a non-restricted manner, and of the annexed drawings, wherein:

FIGS. 1(a) and 1(b) show ¾ views of a trailer according to a first embodiment of the invention respectively in road position (also called the top position) and in so-called loading position (also called the bottom position);

FIGS. 2(a) and 2(b) show side views in the vicinity of a wheel, and according to a cross-section by a plane comprising the straight line (D) appearing in FIG. 1, respectively in top position and in bottom position of the first embodiment of the invention;

FIGS. 3(a) and 3(b) show side views and according to a cross-section by a plane comprising the straight line (D) appearing in FIG. 1, respectively in top position and in bottom position of the first embodiment of the invention;

FIGS. 4(a) and 4(b) show side views of a retracting device respectively in top position and in bottom position according to the first embodiment of the invention;

FIGS. 5(a) and 5(b) show rear views of a trailer respectively in top position and in bottom position according to the first embodiment of the invention;

FIGS. 6(a) and 6(b) show perspective views of an upper portion of a trailer according to the first embodiment of the invention respectively in road position and in so-called loading position;

FIGS. 7(a) and 7(b) show ¾ views of a trailer according to a second embodiment of the invention respectively in road position and in so-called loading position; and FIG. 7(c) has an enlarged view of the end of the trailer, in the vicinity of the hitch tongue.

DETAILED DESCRIPTION

In all of the figures of this document, identical elements and steps are designated by the same numerical reference.

FIGS. 1(a) and 1(b) show ¾ views of a trailer according to a first embodiment of the invention respectively in road position (also called top position) and in so-called loading position (also called bottom position).

More precisely, a trailer 100 according to a first embodiment of the invention comprises an axle 102 which is a shaft comprising two ends whereon are mounted wheels 103 via two mechanical arms 104. Each one of the mechanical arms 104 can carry out a rotation with respect to the centre of a wheel 103 according to a clockwise or anti-clockwise direction. In addition, a chassis 101 is mounted integrally with the axle, and an articulated drawbar 105, V-shaped, is mounted on the axle at two anchoring points.

Such a trailer 100 further comprises at the end of the front head of the articulated drawbar 105 a hitch tongue 108 that makes it possible to carry out the fastening to a towing vehicle.

In the vicinity of the hitch tongue 108 is arranged an actuator comprising a cylinder 106 and a control lever 107 of said cylinder 106. The cylinder 106 is mounted on the chassis 101 at a first end and on the drawbar 105 at the other end.

In this embodiment, the articulated drawbar 105 can be manipulated in such a way that it slides with respect to the chassis, with the sliding being carried out and controlled via a guide not shown in FIG. 1.

When the trailer is in top position, the chassis 101, as well as the articulated drawbar 105 are substantially parallel to the ground.

When a user wants to load objects onto a plateau (not shown) mounted on the chassis of the trailer, he actuates the actuator in such a way that the cylinder 106 is compressed. The compression of the cylinder 106 drives a sliding of the articulated drawbar 105 (with respect to the chassis 101) in the direction of the arrow $F_1$, which itself, being fixed on the axle drives a pivoting according to an arc of circle of the arms 104, and de facto lowers the axle and therefore the chassis mounted on said axle. As such, the user can easily load bulky objects as the slope of inclination of the chassis with respect to the ground is low (of a magnitude of a few degrees).

Once the objects are loaded, the user can actuate the control lever 107 so that the cylinder 106 extends (it is then in so-called towed position).

The cylinder 106 then exerts a force according to the arrow $F_2$ that drives the articulated drawbar 105, in this direction. As such, the mechanical arms 104 then pivot in the direction opposite to that corresponding to the tilting of the chassis. Such a pivoting has for effect to rectify the axle, and therefore the chassis mounted on the latter, until the chassis as well as the articulated drawbar are again substantially parallel to the ground.

FIGS. 2(a) and 2(b) show side views in the vicinity of a wheel, and according to a cross-section by a plane comprising the straight line (D) appearing in FIG. 1, respectively in top position and in bottom position of the first embodiment of the invention.

More precisely, these figures make it possible to provide details on the arrangement of the various components in the vicinity of a wheel 103.

Indeed, a mechanical arm 104 fixed to a wheel 103 is mounted on the axle 102 via an articulated part 202 whereon the articulated drawbar 105 is directly fixed, as well as the chassis 101 of the trailer 100 via another articulated part 201.

Note that the sliding of the articulated drawbar 105, which is articulated thanks to the articulated part 202, drives a movement of the articulated part 202 as well as of each mechanical arm 104, making it possible to obtain a top position or a bottom position according to the orientation of the sliding of the articulated drawbar 105.

Note that the tilting design of the axle makes it possible to retain the conventional suspension used on most luggage trailers, i.e. the four rubber profiles 203 integrated between the two square tubes of the axle 102. In another embodiment, not shown, three rubber profiles are integrated between the two square tubes of the axle.

The FIGS. 3(a) and 3(b) show side views and according to a cross-section by a plane comprising the straight line (D) appearing in FIG. 1, respectively in top position and in bottom position of the first embodiment of the invention.

More precisely, according to this view, a lock for locking the articulated drawbar 105 is distinguished comprising a pin 302, a hole 303 present in the chassis in the vicinity of the actuator, as well as the guide 301 for guiding the articulated drawbar 105. The lock makes it possible to lock the articulated drawbar 105 in a given position (in particular in top position). In addition, such a trailer further comprises a number plate 304 fixed on the chassis, and positioned at the rear end of the trailer. The number plate 304 is furthermore connected by two articulated elements 307, with each articulated element 307 being connected to a connecting rod 306 mounted on an articulated part 202.

As such, when the trailer tilts from a top position to a bottom position, the movement of the articulated parts 202 induces, via the movement of the connecting rods 306, and the articulation of the articulated elements 307 a lifting of the number plate that positions itself in a recess of a part 305 that is positioned at the rear end of the chassis 101. As such, the number plate is easily retracted via the use of a retracting device that comprises the connecting rods 306, the articulation parts 202, the articulated elements 307 and the hollow part 305, during the lowering of the chassis 101.

FIGS. 4(a) and 4(b) show side views of the retracting device respectively in a top position and in a bottom position according to the first embodiment of the invention.

Finally, FIGS. 5(a) and 5(b) show rear views of a trailer respectively in top position and in bottom position according to the first embodiment of the invention. As such, the advantage of using a retracting device for retracting a number plate are clearly distinguished. Indeed, without the device, it would not be practical to load heavy and bulky objects as the latter would have to be lifted. This trailer makes it possible to overcome this problem.

Finally, in a particular embodiment of the invention, the guide 301 makes it possible to provide a sliding connection, and such guide can consist of rails, or rolling elements such as rollers, pads, or ball sleeves.

FIGS. 6(a) and 6(b) show perspective views of an upper portion of a trailer according to the first embodiment of the invention respectively in road position and in so-called loading position. These views make it possible to emphasise the actuator according to the first embodiment, as well as the guide and the lock.

Note that the actuator, comprising the cylinder 106 in particular, is mounted on the chassis 101 on the one hand, and on the end of the drawbar 105 on the other hand, in the vicinity of the hitch tongue 108.

Moreover, the cylinder 106 is arranged above the drawbar 105, which facilitates access to the cylinder and protects it, furthermore, from projections from the road.

The FIGS. 7(a) and 7(b) show ¾ views of a trailer according to a second embodiment of the invention respectively in road position and in so-called loading position.

As such, in this embodiment, only the actuator of the sliding of the articulated drawbar are different with respect to the first embodiment of the invention. Indeed, in this embodiment, a cylinder 701 is mounted on the axle 102 via an articulation 702 corresponding to an articulated part 202, as well as on the drawbar 105. Such a cylinder 701 is connected via a pipe (hose) 703 to a pump 704 mounted in the vicinity of the hitch tongue 108, with said pump being actuated by a lever 705 also positioned in the vicinity of the hitch tongue 108. The other means are similar to those shown in liaison with FIGS. 2 to 6.

In this embodiment, when a user wants to load objects onto a plateau (not shown) mounted on the chassis of the trailer, he actuates the actuator in such a way that the cylinder 701 is extended. The cylinder 701 then drives a sliding of the articulated drawbar 105 in the direction of the arrow $F_2$, which itself, being fixed on the axle 102 drives a pivoting according to an arc of circle of the arms 104, and de facto lowers the axle 102 and therefore the chassis 101 mounted on said axle. As such, the user can easily load bulky objects as the slope of inclination of the chassis with respect to the ground is low (of a magnitude of a few degrees).

FIG. 7(c) shows an enlarged view of the end of the trailer, in the vicinity of the hitch tongue. As such, the positioning of the pump 704 mounted in the vicinity of the hitch tongue 108 is clearly distinguished.

Once the objects are loaded, the user can actuate the control lever 705 so that the cylinder 701 is compressed.

The compression of the cylinder 701 then exerts a force according to the arrow $F_1$ that drives the articulated drawbar 105, in this direction. As such, the mechanical arms 104 then pivot in the direction opposite that corresponding to the tilting of the chassis. Such a pivoting has for effect to rectify the axle, and therefore the chassis mounted on the latter, until the chassis as well as the articulated drawbar are again substantially parallel to the ground.

An exemplary embodiment of the present disclosure overcomes different disadvantages of prior art.

An exemplary embodiment provides a trailer that is compliant with European road safety standards.

An exemplary embodiment provides such a trailer of which the cost of manufacture is relatively low.

An exemplary embodiment provides such a trailer that can be obtained by carrying out few modifications on a trailer sold on the market.

An exemplary embodiment provides such a trailer that makes it possible to lower a chassis with a low slope, by a magnitude of 3 to 5 degrees with respect to the ground.

An exemplary embodiment provides such a trailer that can tilt or be lifted rapidly.

An exemplary embodiment provides such a trailer that makes it possible to carry out a tilting that is not abrupt, and this without using specific additional means of braking.

Although the present disclosure has been described with reference to one or more examples, workers skilled in the art will recognize that changes may be made in form and detail without departing from the scope of the disclosure and/or the appended claims.

The invention claimed is:

1. A tilting trailer comprising:
    a chassis mounted on an axle that pivots with respect to first and second wheels of said trailer;
    an articulated drawbar mounted on said axle, said articulated drawbar being mounted so that it is free and sliding with respect to said chassis; and
    an actuator, which actuates sliding of said articulated drawbar,
    wherein said articulated drawbar is V-shaped, a first end being fixed to a hitch tongue, a second end being fixed to said axle via a first articulated part in a vicinity of the first wheel, and a third end being fixed to said axle via a second articulated part in a vicinity of the second wheel, and wherein said trailer is movable between a top position, also called road position, in which the chassis and the drawbar are substantially parallel to ground, and a bottom position also called loading position, in which the chassis is inclined with respect to the ground.

2. The trailer according to claim 1, wherein said actuator comprises a control lever and a cylinder belonging to the group consisting of:
- a hydraulic cylinder;
- a pneumatic cylinder;
- an electric cylinder;
- a mechanical cylinder.

3. The trailer according to claim 1, wherein said actuator is mounted in a vicinity of a hitch tongue mounted on said articulated drawbar.

4. The trailer according to claim 1, wherein said actuator is integral with said chassis and with said articulated drawbar.

5. The trailer according to claim 1, wherein the trailer comprises a guide, which guides a movement of said articulated drawbar during a sliding of said articulated drawbar with respect to said chassis.

6. The trailer according to claim 5, wherein said guide comprises rails or rolling elements.

7. The trailer according to claim 1, wherein the trailer comprises a lock, which locks a position of said articulated drawbar.

8. The trailer according to claim 7, wherein said lock includes a pin or a rivet.

9. The trailer according to claim 1, wherein the trailer comprises a number plate fixed to said chassis, and a retracting device for retracting said number plate making it possible to retract said plate during the tilting of said chassis.

10. The trailer according to claim 9, wherein said retracting device is automatically activated during the activation of the actuator.

11. The trailer according to claim 1, wherein a first portion of said actuator is mounted on said articulated drawbar and a second portion of said actuator is mounted on said axle.

12. The trailer according to claim 11, wherein said first portion of said actuator comprises a pump, and said second portion of said actuator comprises a cylinder connected to said pump.

13. The trailer according to claim 1, wherein the trailer comprises a suspension located inside said axle.

14. A tilting trailer comprising:
- a chassis mounted on an axle that pivots with respect to first and second wheels of said trailer;
- an articulated drawbar mounted on said axle, said articulated drawbar being mounted so that it is free and sliding with respect to said chassis, wherein said articulated drawbar is V-shaped, a first end being fixed to a hitch tongue, a second end being fixed to said axle in a vicinity of the first wheel, and a third end being fixed to said axle in a vicinity of the second wheel;
- an actuator, which actuates sliding of said articulated drawbar;
- a number plate fixed to said chassis; and
- a retracting device for retracting said number plate making it possible to retract said plate during the tilting of said chassis.

* * * * *